United States Patent
Zwing et al.

(10) Patent No.: US 9,726,484 B2
(45) Date of Patent: Aug. 8, 2017

(54) LEVEL DEVICE

(71) Applicant: SOLA-Messwerkzeuge GmbH, Goetzis (AT)

(72) Inventors: Lukas Zwing, Hard (AT); Wolfgang Scheyer, Goetzis (AT)

(73) Assignee: SOLA-MESSWERKZEUGE GMBH, Goetzis (AT)

( * ) Notice: Subject to any disclaimer, the term of this patent is extended or adjusted under 35 U.S.C. 154(b) by 20 days.

(21) Appl. No.: 14/688,145

(22) Filed: Apr. 16, 2015

(65) Prior Publication Data

US 2015/0308821 A1    Oct. 29, 2015

(30) Foreign Application Priority Data

Apr. 25, 2014 (AT) ..................... 298/2014

(51) Int. Cl.
| | | |
|---|---|---|
| *G01C 9/28* | (2006.01) | |
| *B29C 45/16* | (2006.01) | |
| *G01C 9/32* | (2006.01) | |
| *G01C 9/34* | (2006.01) | |
| *B29L 9/00* | (2006.01) | |
| *B29L 31/00* | (2006.01) | |

(52) U.S. Cl.
CPC ............ *G01C 9/28* (2013.01); *B29C 45/16* (2013.01); *G01C 9/32* (2013.01); *G01C 9/34* (2013.01); *B29L 2009/00* (2013.01); *B29L 2031/752* (2013.01)

(58) Field of Classification Search
CPC ............ G01C 9/18; G01C 9/24; G01C 9/32
USPC .......................................................... 33/379
See application file for complete search history.

(56) References Cited

U.S. PATENT DOCUMENTS

| | | |
|---|---|---|
| 2,679,698 A | 6/1954 | Roberts |
| 4,392,184 A | 7/1983 | Hearold et al. |
| 4,843,724 A | 7/1989 | Greenland |

(Continued)

FOREIGN PATENT DOCUMENTS

| | | |
|---|---|---|
| AT | 409 549 | 9/2002 |
| AT | 509 146 | 6/2011 |

(Continued)

OTHER PUBLICATIONS

Austrian Patent Office Search Report (ASR) issued Feb. 17, 2015 in Austrian Patent Application No. A 298/2014.
State Intellectual Property Office of the People's Republic of China Search Report issued Dec. 20, 2016 in Chinese Patent Application No. 201510409585.7.

*Primary Examiner* — Yaritza Guadalupe-McCall
(74) *Attorney, Agent, or Firm* — Wenderoth, Lind & Ponack, L.L.P.

(57) ABSTRACT

A level device for a spirit level includes a level device body, and a substantially cylindrical cavity formed by an inside wall of the level device body. The cavity has a longitudinal axis and serves to accommodate a liquid, and the level device body is arranged in a carrier body. The carrier body includes two transparent covers for closing the carrier body and preferably includes a casing body which is preferably in the form of a circular ring. An outside wall of the level device body has a curved region with a curvature in the longitudinal direction relative to the longitudinal axis of the cavity, by which a magnifying glass effect can be achieved when viewing a marker body which can be arranged in the cavity.

20 Claims, 9 Drawing Sheets

(56) References Cited

U.S. PATENT DOCUMENTS

| | | | | |
|---|---|---|---|---|
| 5,199,177 | A * | 4/1993 | Hutchins | G01C 9/32 33/379 |
| 5,476,258 | A * | 12/1995 | Frisone | A63B 57/353 33/377 |
| 6,760,975 | B1 * | 7/2004 | Schmidt | G01C 9/28 33/379 |
| 7,024,781 | B1 * | 4/2006 | Cowie | G01C 9/32 33/348 |
| 7,900,366 | B2 * | 3/2011 | Spaulding | G01C 9/32 33/348 |
| 8,266,809 | B2 | 9/2012 | Scheyer et al. | |
| 8,327,552 | B2 * | 12/2012 | Scheyer | G01C 9/32 33/348 |
| 2007/0266577 | A1 * | 11/2007 | Tran | G01C 25/00 33/379 |
| 2011/0162222 | A1 * | 7/2011 | Ben-Josef | G01C 9/34 33/379 |
| 2015/0308821 | A1 * | 10/2015 | Zwing | B29C 45/16 33/379 |

FOREIGN PATENT DOCUMENTS

| | | |
|---|---|---|
| CN | 2336326 | 9/1999 |
| CN | 2869781 | 2/2007 |
| CN | 201188001 | 1/2009 |
| DE | 1 914 699 | 10/1970 |
| DE | 6911616 | 4/1972 |
| EP | 0 971 206 | 1/2000 |
| GB | 1 210 449 | 10/1970 |
| GB | 1 247 124 | 9/1971 |
| JP | 8-278128 | 10/1996 |

* cited by examiner

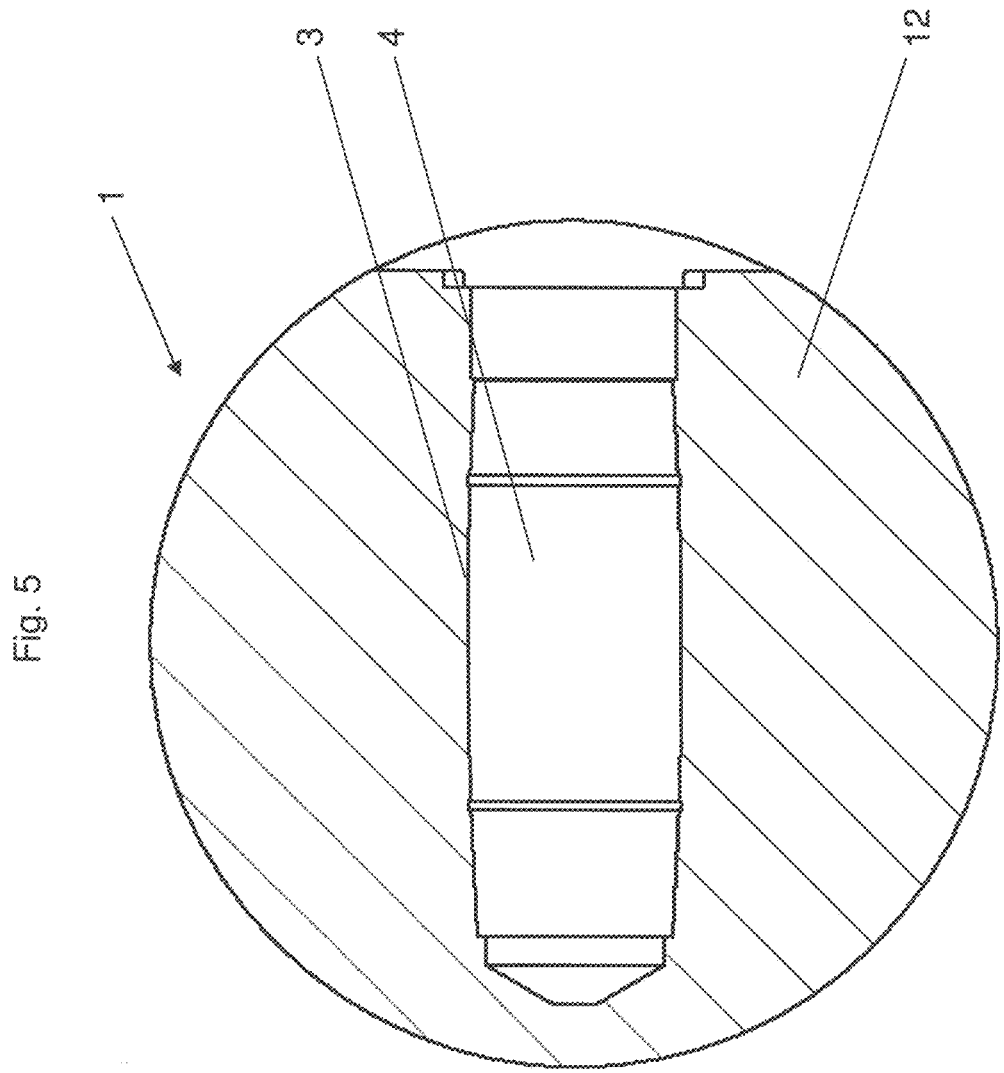

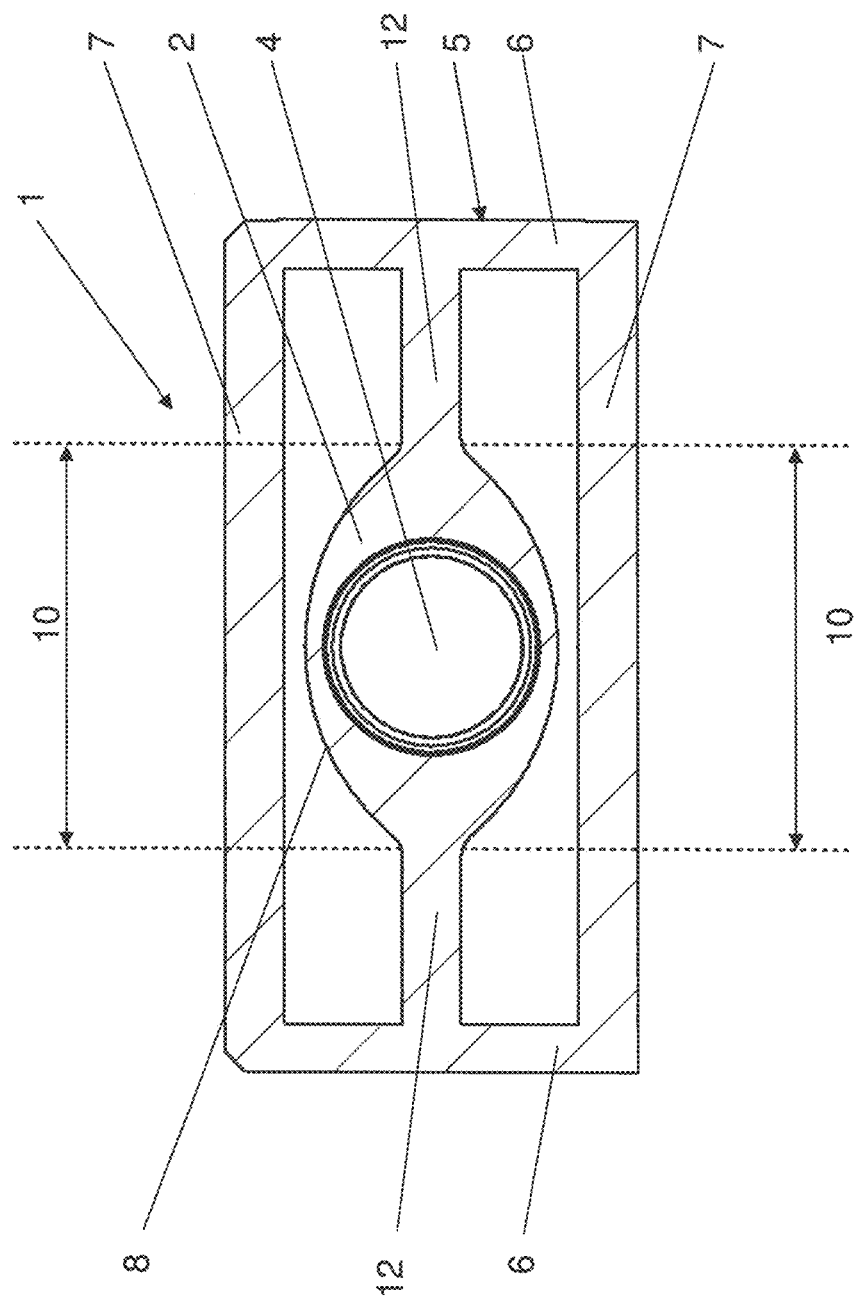

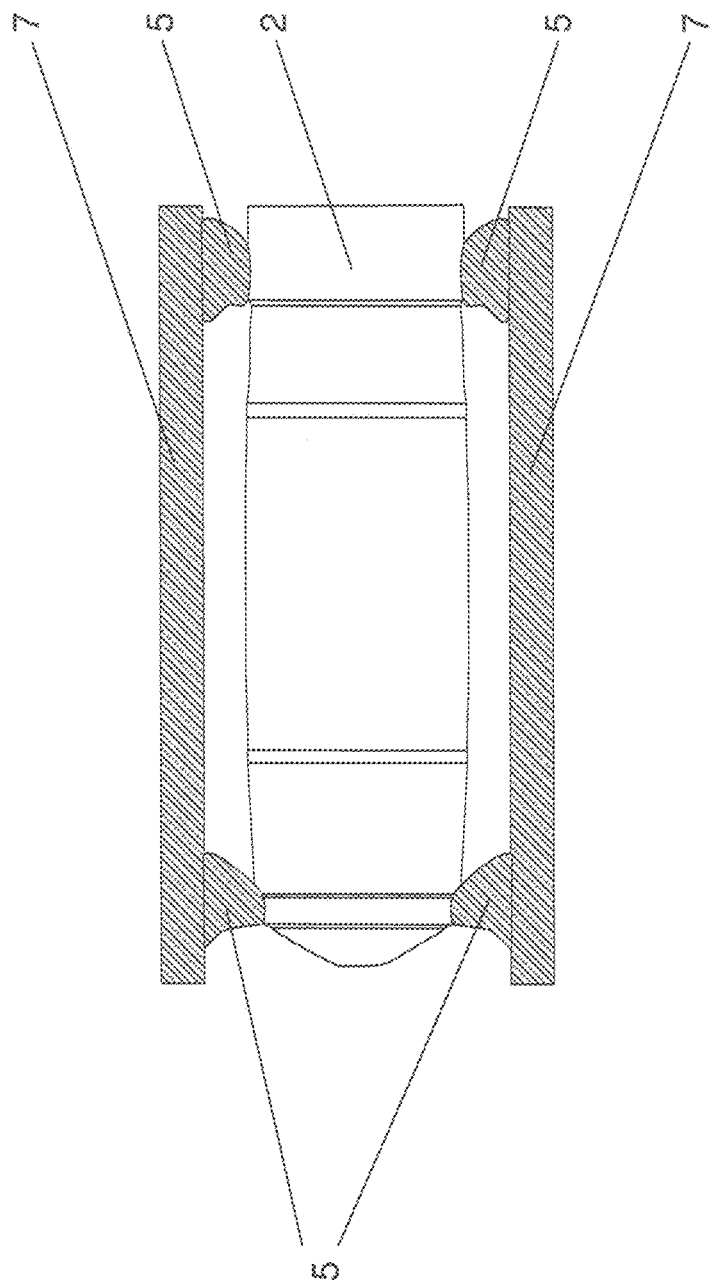

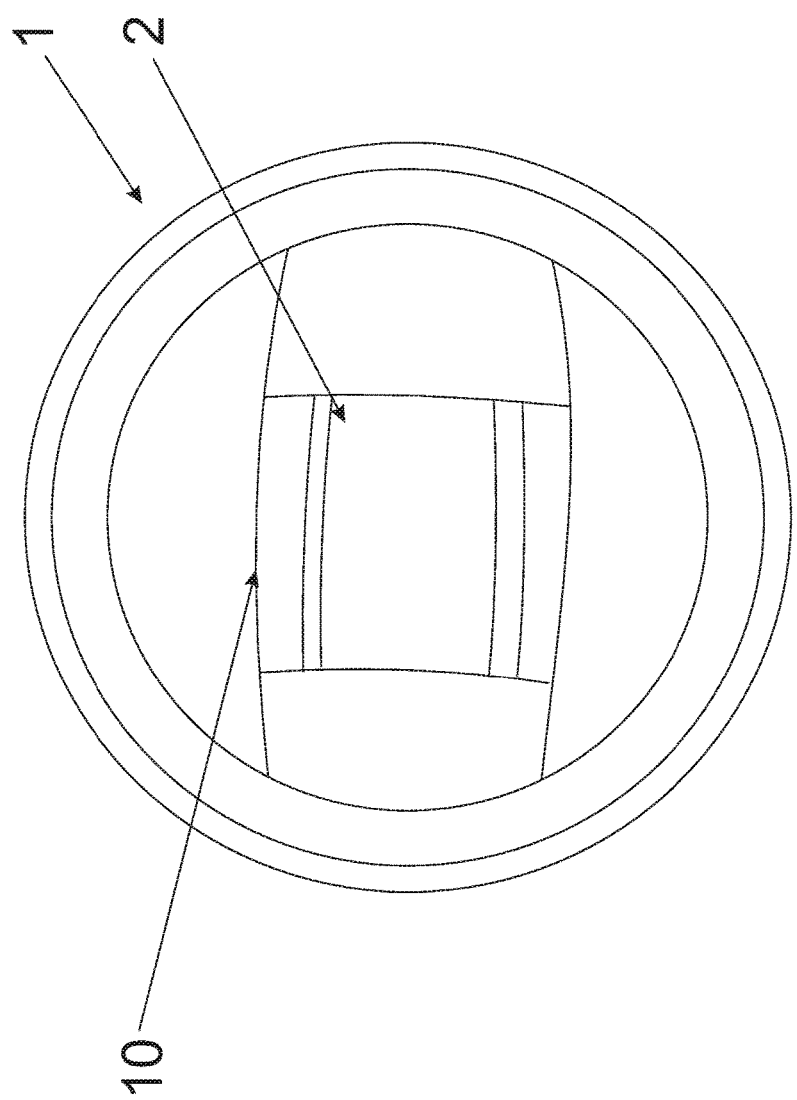

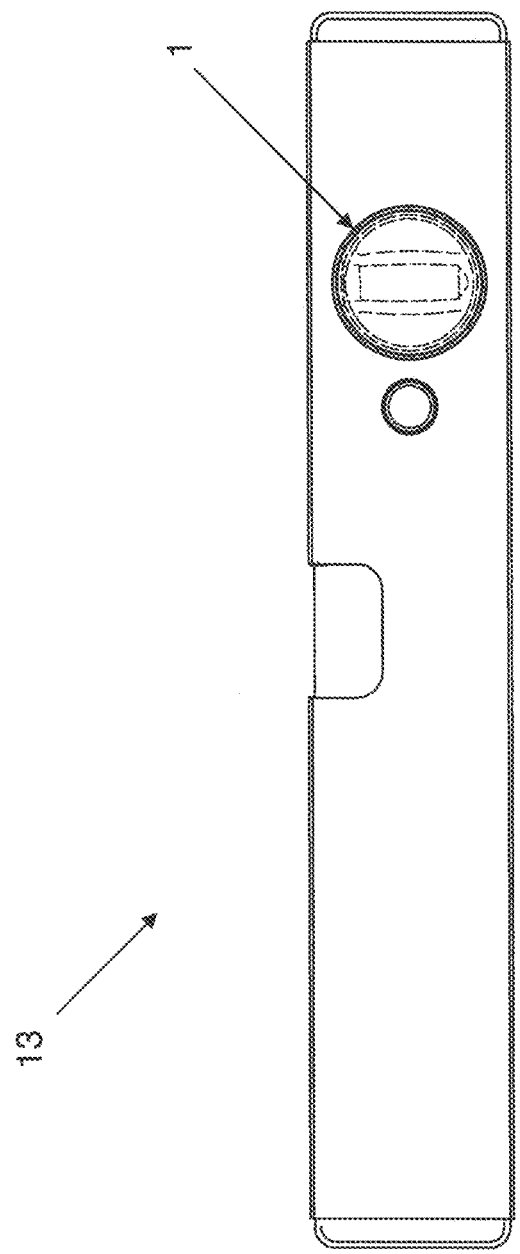

LEVEL DEVICE

BACKGROUND OF THE INVENTION

Technical Field

The invention concerns a level device, in particular for a spirit level, having the features discussed below.

The invention also concerns a spirit level having at least one such level device and a process for the production of such a level device.

Level devices are required for a large number of measuring instruments, including spirit levels, laser measuring devices, tripods and the like. Level devices are nowadays mostly made from plastic material and have a substantially cylindrical cavity for receiving a level liquid and a marking body which is generally in the form of an air bubble. The leveling position of the level device is so determined that the marking body comes to lie between two markings which are generally provided at the inside of the cavity accommodating the liquid. The cavity is generally of a barrel-shaped basic shape so that the marking body assumes a stable position in the leveling operation.

Background Art

Attempts are known from the state of the art to improve the readability of the level device and thus the degree of accuracy in determining the leveling position.

German laid-open specification DE 1914699 discloses a level device comprising a plastic body, wherein at least one of the surfaces of the plastic body is curved. In that arrangement that curvature of the surface is kept of a lens-shaped configuration and there is a curvature both in the longitudinal direction and also in the transverse direction. In that case the level device body containing the cavity is of a cuboidal configuration and the lens-shaped portions are formed by way of additional material at the side surfaces of the cuboidal level device body. The curvature on the cuboidal plastic body is in the form of a portion of a circular arc, both in the longitudinal direction and also in the transverse direction. The radius of the lens-shaped portion in the longitudinal direction approximately corresponds to 2.5 times length and the radius of the lens-shaped portion in the transverse direction approximately corresponds to 1.17 times the width of the cuboid. In that way the aim is to achieve an optical magnification, in particular of the marking lines and the marking body, in the region of the cavity.

British patent specification GB 1210449 teaches a level device for a spirit level comprising a transparent level device body which includes a cavity for receiving the level device liquid and the marking body, wherein the wall thickness of the level device body is of a lens-shaped configuration to achieve a magnification effect. Disadvantages here are the low degree of optical magnification which can be achieved and the depression which occurs in the installation position in the spirit level.

The proposals disclosed in the state of the art for improved readability or for optical magnification of the marking body however can only be applied to so-called horizontal level devices, or they suffer from disadvantages in use when applied to vertical level devices.

Horizontal level devices are level devices having a substantially cuboidal level device body, which are used to determine the horizontal position in spirit levels. In the installation position, for example in a spirit level, the level device body forms with three of its outside surfaces the boundary surface which faces outwardly, that is to say that arrangement does not involve any enclosure of the level device body in a further transparent body.

To determine the vertical position in spirit levels, so-called vertical level devices, also referred to as round level devices or plumb level devices, are used. In vertical level devices the level device body is injection molded with an initially cylindrical or slightly conical cavity which is subsequently turned out in a barrel shape.

In contrast to horizontal level devices the level device body is arranged for use in a carrier body which extends around the level device body and has transparent covers. The carrier body is generally of a cylindrical basic shape but it can also be oval or cuboidal.

The viewing angle when reading off the vertical level device would be severely restricted if the generally cuboidal or barrel-shaped level device body were fitted alone, that is to say without an additional carrier body and in flush relationship, into the main body of the measuring means. For, in that case, in fact with shallow viewing angles, the edge of the recess into which the level device body is fitted into the measuring means is disposed in the field of view of the observer. A vertical level device is frequently read off in overhead operations, and for that reason great significance is attributed to that point.

Fitment of the generally cuboidal or barrel-shaped level device body into a markedly enlarged and for example round recess is disadvantageous as dirt can here pass into the recess.

That results in the need to offer vertical level devices in a carrier body and provided with covers.

That generally cylindrical carrier body comprises an annular body which forms the peripheral casing and two covers for closing the carrier body.

The production of vertical level devices with a box with plane-parallel covers is subject to restrictions. More specifically it has proven to be impracticable from the production engineering point of view for the vertical level device to be in the form of a solid injection molding, that is to say in one piece and without cavities. Implementation in the form of a solid injection molding would be suitable in the best-case scenario for very small level devices which in turn are difficult to read off. For, the thick-walled nature of the component means that so-called collapse depressions occur due to shrinkage, whereby the boundary surfaces which face outwardly in the installation condition, that is to say the cover surfaces of the cylindrical carrier body, are no longer plane-parallel and flat. Those deformations which lead to severe optical impairments can be corrected, if at all, only by complicated and expensive mechanical post-treatment.

The outside contour of the level device body can be cylindrical or cuboidal. A disadvantage with vertical level devices with cuboidal outside contours is that, when conducting reading-off operations which differ from the horizontal in relation to the level device which is disposed in the leveling position, the edges of the cuboidal outside contour interfere with the reading as the bubble appears duplicated due to refraction at the edge of the cuboidal outside contour.

Vertical level devices in accordance with the state of the art suffer from numerous disadvantages: they have edges at the level device body, by which the marking body appears optically divided or distorted. If the aim is to achieve a lens effect, they exhibit an outward curvature, that is to say in the installation situation in a spirit level, a depression or recess is always formed, in which dirt can be deposited.

BRIEF SUMMARY OF THE INVENTION

Therefore the object of the present invention is to provide a level device which has a magnification effect for improved readability.

A further aim is to provide a level device which can be very substantially produced in one piece and which in the installation situation has flat surfaces so that no dirt can be deposited on the level device upon use of the measuring means.

The invention also seeks to provide a spirit level using an improved level device and a process for the production thereof.

Those objects are attained by a level device as set forth below, as well as a spirit level as set forth below. A process for the production of such a level device is set forth below. Advantageous embodiments are defined below.

In the configuration of the level device according to the invention it comprises a level device body and a substantially cylindrical cavity formed by an inside wall of the level device body, wherein the cavity has a longitudinal axis and serves to receive a liquid, wherein the level device body is arranged in a carrier body, wherein the carrier body includes two transparent covers for closing the carrier body and preferably includes a casing body which is preferably in the form of a circular ring, wherein an outside wall of the level device body has a curved region, by which a magnifying lens effect can be achieved when viewing a marker body which can be arranged in the cavity.

This example describes the particularly preferred case where an optical magnification effect, in particular optical magnification of the marker body, is achieved by curvature of the outside wall of the level device body.

A curvature can be present both in the longitudinal direction and also in the transverse direction relative to the longitudinal axis of the cavity. Curvature in the longitudinal direction means that the contour of the outside wall of the level device body in a section through the level device body in the longitudinal direction of the cavity forms a circular arc or approximately a circular arc. Curvature in the transverse direction means that the contour of the outside wall of the level device body in a section normal to the longitudinal axis of the cavity forms a circular arc having a radius of curvature less than that of a notional cylinder circumscribing the level device body.

In a further preferred embodiment therefore the level device comprises a level device body and a substantially cylindrical cavity formed by an inside wall of the level device body, wherein the cavity has a longitudinal axis and serves to accommodate a liquid, wherein the level device body is arranged in a carrier body, wherein the carrier body includes two transparent covers for closing the carrier body and preferably includes a casing body which is preferably in the form of a circular ring, wherein either the level device body and the casing body of the carrier body or at least one of the covers and at least a part of the level device body are produced in one piece.

In other words, here the substantially one-piece manufacture is implemented in that, in accordance with the first variant, the level device body is injection molded together with the casing body. In this variant the covers are produced separately and the carrier body is then closed therewith. In the other variant, at least one of the covers and at least a part of the level device body are already produced in one piece. In this case therefore the second cover and the casing body are subsequently fitted.

In one piece means that the portions are produced in one working operation and connected together in substance-to-substance bonded relationship. In general the level device is produced by plastic injection molding, that is to say one-piece manufacture means that the level device according to the invention is produced in a single injection molding operation.

Particularly preferably it can be provided that both covers and the level device body are produced in one piece. In the case described herein therefore the covers and the level device body are produced as one. Subsequent fitment and sealingly connecting the covers is therefore not necessary.

A further configuration provides that the level device body and the casing body of the carrier body as well as one of the covers are produced in one piece. In this development therefore the level device body, the casing body of the carrier body and one of the covers are produced as one.

In a further development it is provided that the level device body and the casing body of the carrier body as well as both covers are produced in one piece. In that way the entire level device consisting of level device body, casing body and both covers are produced as one.

It can particularly preferably be provided that the outside wall of the level device body, in relation to the longitudinal axis of the cavity, has at least two mutually oppositely disposed curved regions.

A further embodiment provides that the at least two mutually oppositely disposed curved regions are connected together by further curved regions so that this gives a curved region which is peripherally closed around the longitudinal axis of the level device body. This embodiment therefore provides a peripherally closed curvature for the outside wall of the level device body.

It can further be provided that the at least two mutually oppositely disposed curved regions are arranged peripherally spaced from each other.

A further configuration provides that the at least two mutually oppositely disposed curved regions are peripherally spaced from each other by a leg or land. This therefore involves a structure which supports the level device body at its periphery and thus interrupts the curved regions. That can be implemented for example in such a way that material in a surface which is parallel to the covers and which preferably extends centrally in relation to the height of the casing body extends from the casing body to the level device body. The level device body can be supported in that way. In a cross-section normal to the longitudinal axis of the cavity that therefore gives a leg which contacts the level device body at its periphery and thus interrupts the curved regions. The leg can be in the form of a closed surface or interrupted.

Particularly preferably it is provided that the outside wall of the level device body is spaced at least in the curved regions from the covers of the carrier body. If more specifically the level device body and the covers were to be in contact then that contact point results in an optical impairment. The advantage of this embodiment is also that, upon the ingress of moisture into the space between the covers and the level device body, no meniscus of condensate is formed between the level device body and the covers.

In a further embodiment it is provided that the level device body is connected to the carrier body only at at least one of the end regions of its longitudinal axis. That example describes the situation where the level device body is connected at one or both of its ends to the casing body.

It is preferably provided that the level device body is of an edge-free configuration at least in the curved regions of the outside wall. As edges can result in optical impairment the outside wall is preferably of an edge-free configuration.

In regard to the curvature it can be provided that the curvature of the at least two curved regions is provided in the longitudinal direction of the level device body.

Equally it can be provided that the curvature of the at least two curved regions is provided in the transverse direction of the level device body.

It can also be provided that the outside wall of the level device body is curved both in the longitudinal direction and also in the transverse direction of the level device body.

The greatest magnifying effect occurs when the outside wall of the level device body is curved both in the longitudinal direction and also in the transverse direction of the level device body.

The cavity can be partially filled with at least one liquid and is closed by a plug.

In order further to improve the readability of the level device, specifically in difficult lighting conditions, it can be provided that a light-enhancing substance is applied at the periphery of the casing body of the carrier body. The substance can be for example fluorescent dyes or coloring agents which convert invisible UV light into visible light and thus increase the light yield or phosphorescent dyes or coloring agents which store light energy and deliver it with a delay, that is to say they luminesce.

In the spirit level it can be provided that light from a light source within the spirit level can be coupled in by way of the periphery of the casing body of the carrier body. Described here is the advantageous variant wherein light is brought to the level device by way of the interior of the spirit level. That can be implemented for example in such a way that a lighting means, for example a light emitting diode, is arranged within the spirit level. It is also possible for light from other regions of the spirit level, for example windows, to be passed through the spirit level to the level device by way of a suitable optical means.

The main body of the spirit level is preferably in the form of a hollow profile. It can be provided that the at least one level device is arranged in a main body of the spirit level as a vertical level device.

BRIEF DESCRIPTION OF THE DRAWINGS

The invention is described in greater detail by means of the following Figures in which:

FIG. 5 shows a section through a level device as shown in FIG. 4, wherein the section plane is parallel to the covers and in relation to the cavity in the center thereof, that is to say it is in the region of its largest diameter, FIG. 6 shows a section through a level device as shown in FIG. 4, wherein the section plane is normal to the longitudinal axis of the cavity for accommodating the level device liquid and centrally intersects the level device body, FIG. 7 shows a longitudinal section through a level device, FIG. 8 shows a level device as shown in FIG. 1, and FIG. 9 shows a spirit level having a level device.

DETAILED DESCRIPTION OF THE INVENTION

Figure 1:
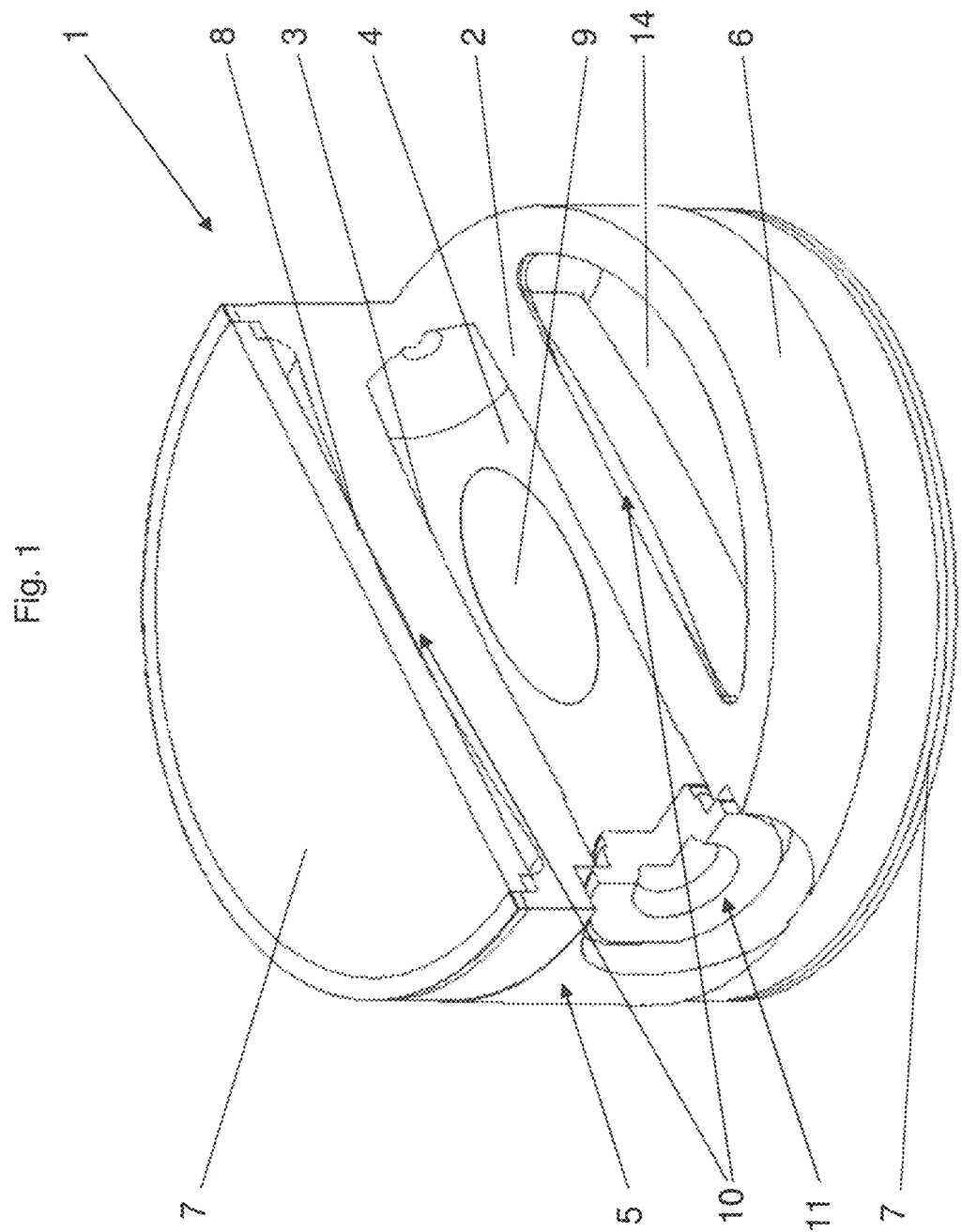
FIG. 1 shows a section through a level device as a three-dimensional view, wherein here the covers are produced separately and the level device body is connected in its end regions to the casing body.

The detailed specific description of the Figures now follows:

FIG. 1 shows a section through a level device 1 as a three-dimensional view, wherein in this embodiment of the level device 1 the covers 7 are in the form of separate components and the level device body 2 is connected in its end regions to the casing body 6. The curved regions 10 are clearly indicated by arrows. In the present embodiment the level device body 2 and the casing body 6 of the carrier body 5 are made in one piece. In this embodiment the covers 7 are separately fixed on the carrier body 5. The drawing further shows the marking body 9 which comes to lie in the cavity 4. There are material openings 14 so that the level device is not solid and thus a magnifying glass effect can be afforded, for to produce a magnification effect there is a need for the transition between different optical media. It can be seen by way of indication by virtue of the section that the curved regions 10 extend peripherally around the level device body 2. The plug 11 is also clearly shown.

What is particularly advantageous with the embodiment of FIG. 1 is that the curvature of the curved regions 10 is in two directions in space. The curvature can therefore be provided both in the longitudinal direction and in the transverse direction relative to the extent of the cavity 4. That gives a particularly effective magnification effect when reading off the marker body 9. The Figure does not show the markings, between which the marker body 9 comes to lie in the leveling position. Those markings can be in the form of marking rings or, as is known from a European patent application to the present applicant, EP 2386825 A1, they may comprise darkened regions, between which the marker body comes to lie in the leveling position.

Figure 2:
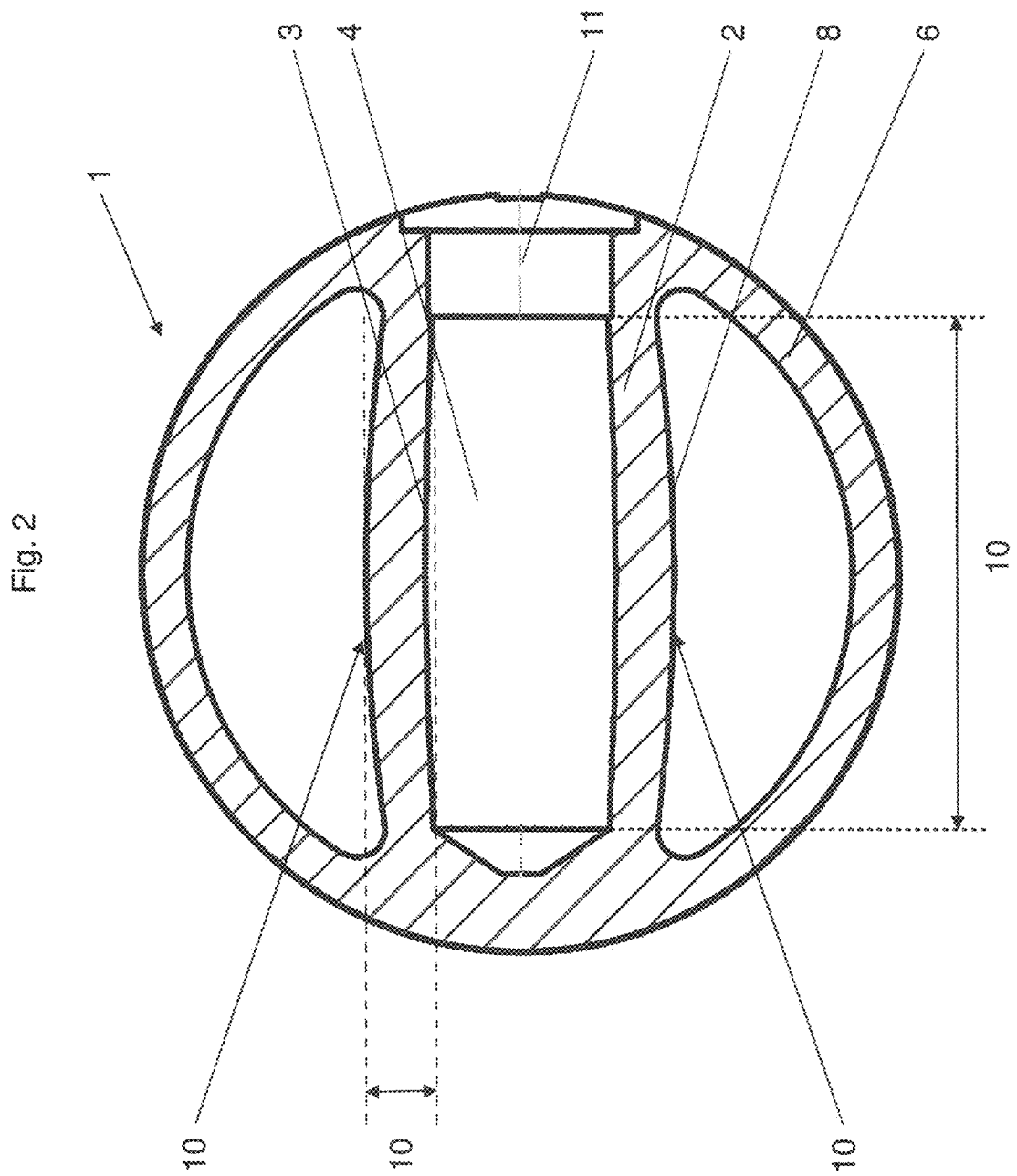
FIG. 2 shows a section through a level device as shown in FIG. 1, wherein the section plane is parallel to the covers and in relation to the cavity in the center thereof, that is to say it is in the region of its largest diameter.

FIG. 2 shows a section through a level device as shown in FIG. 1, wherein the section plane is selected to be parallel to the covers 7 (not visible in this section) and, with respect to the cavity 4, in the center thereof, that is to say in the region of its largest diameter. It is possible to see the curved region 10 of the outside wall 8 of the level device body 2. The curved region is once again clearly indicated by the horizontal and vertical dotted auxiliary lines. The barrel shape of the cavity 4 can also be particularly clearly seen by virtue of the horizontal auxiliary lines.

Figure 3:
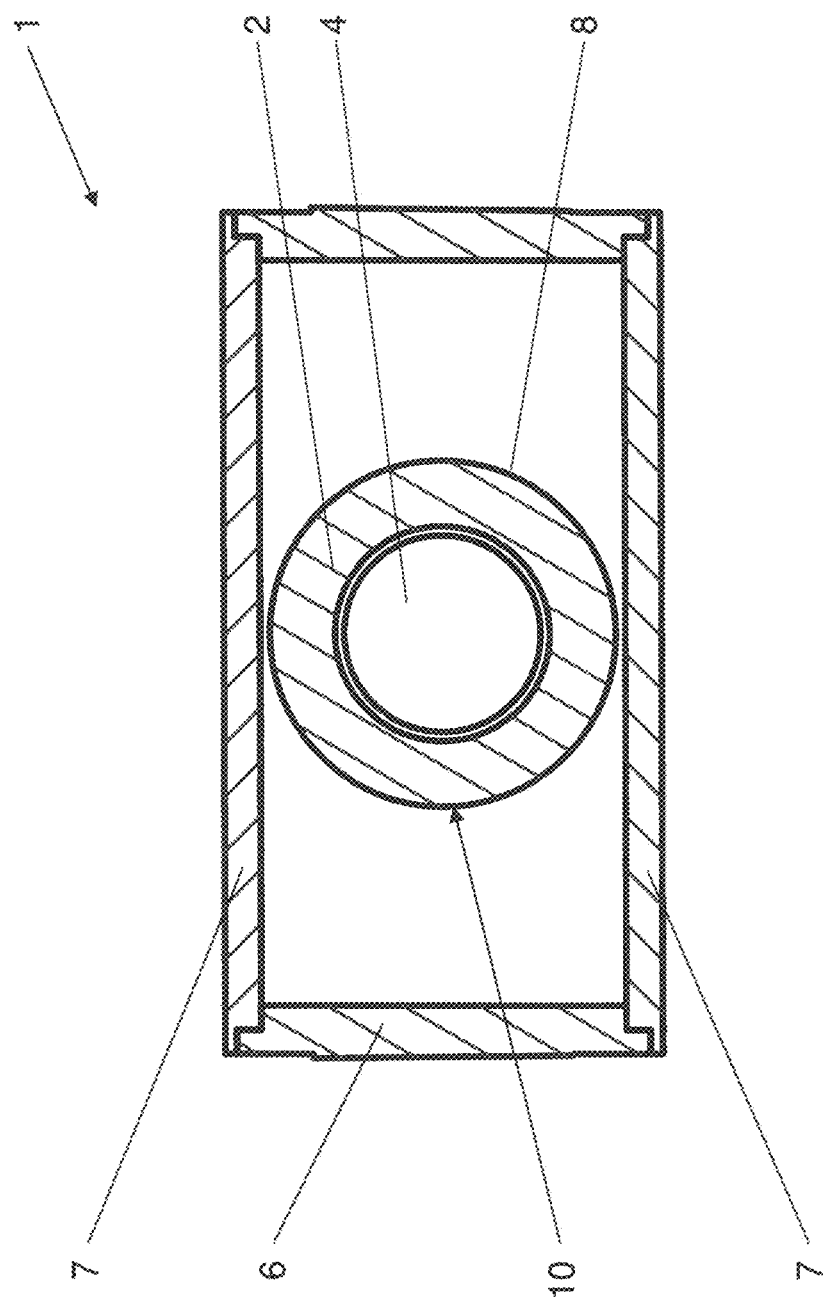
FIG. 3 shows a section through a level device as shown in FIG. 1, wherein the section plane is normal to the longitudinal axis of the cavity for accommodating the level device liquid and centrally intersects the level device body.

FIG. 3 shows a section through a level device as shown in FIG. 1, wherein the section plane is normal to the longitudinal axis of the cavity 4 intended to accommodate the level device liquid, and centrally intersects the level device body 2. The covers 7 are here in the form of separate components and are fitted on the casing body 6. It will be seen that the outside wall 8 of the level device body 2 is spaced from the covers 7.

The curved regions 10 extend peripherally around the level device body 2, whereby a peripherally extending curvature can be seen in the sectional view. It can also be seen that, in this section, the level device body 2 does not involve any substance-to-substance bonding join with respect to the casing body 6 as the level device body 2 is in fact connected to the casing body 6 only at at least one of its end regions, with respect to its longitudinal extent.

Figure 4:
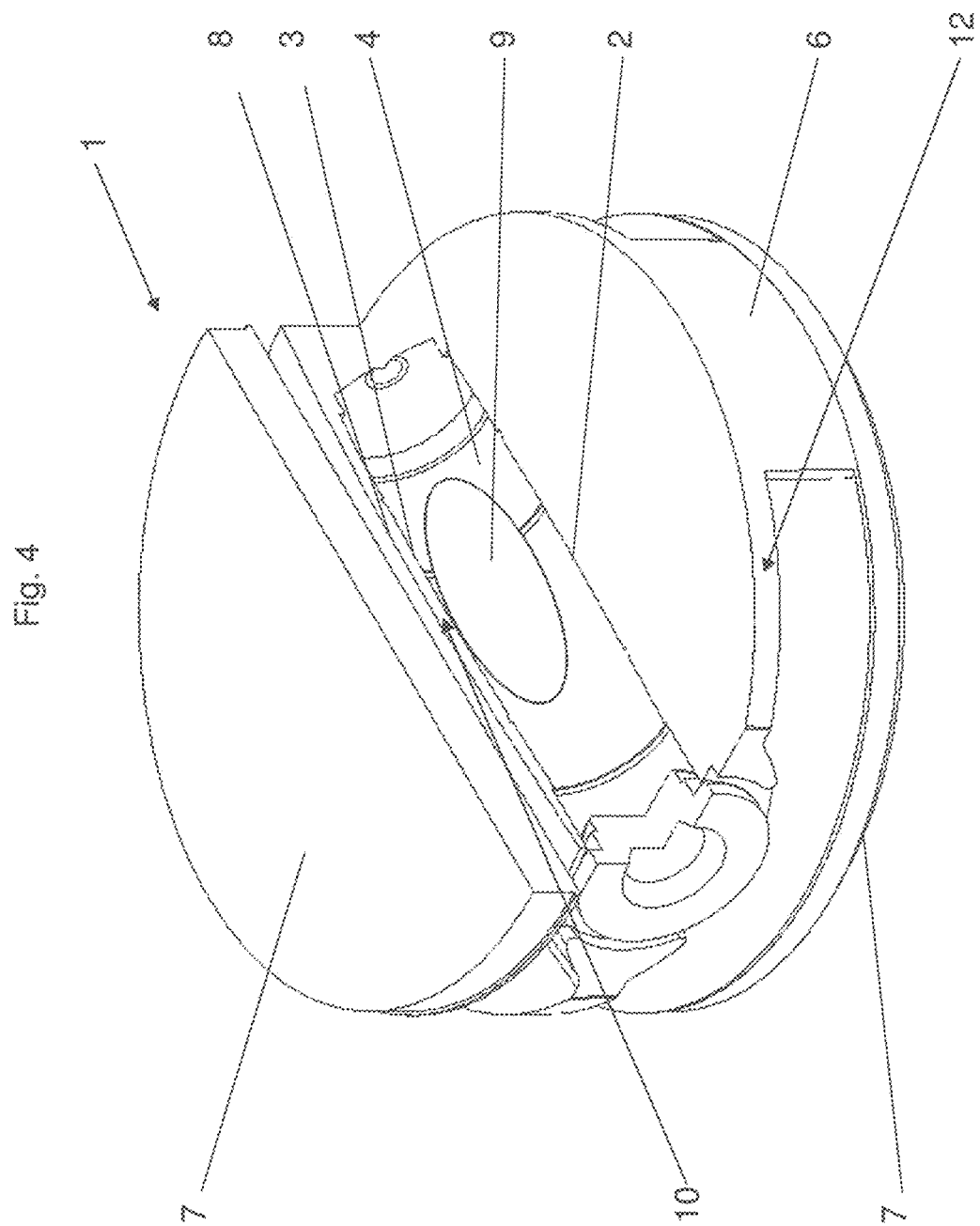
FIG. 4 shows a section through a level device as a three-dimensional view, wherein the level device body in this case is supported by an incorporated plane.

FIG. 4 shows a section through a further embodiment of a level device 1, as a three-dimensional view. In the embodiment illustrated here the level device has a land or leg surface 12 by which the level device body 2 is held. The surface 12 extends parallel to the covers 7. In comparison with the embodiment of FIG. 1 where the level device body 2 is connected at its end regions to the casing body 6 and is carried by the latter, the embodiment of FIG. 4 provides that the level device body is connected along its longitudinal side to the land surface 12 and is carried thereby. An arrow also clearly indicates the curved region 10. The level device 1 shown here is in one piece together with the covers 7, the level device body 2, the casing body 6 and the land surface 12. It will be clearly apparent that the curved region 10 is interrupted by the land surface 12. The curved region 10 is spaced from the covers 7.

FIG. 5 shows a section through a level device as shown in FIG. 4, wherein the section plane is selected to be parallel to the covers 7 and, with respect to the cavity 4, is in the center thereof, that is to say in the region of its largest diameter. The section plane therefore also intersects the land surface 12. It will be clear from the section that the level device body 2, as can be clearly seen here the outside contour 3 of the cavity 4, is engaged along its periphery by the land surface 12.

FIG. 6 also shows a section through a level device 1 as shown in FIG. 4, in this case the section plane being normal to the longitudinal axis of the cavity 4 and centrally intersecting the level device body 2. The one-piece structure can be particularly clearly seen here. The level device body 2 is carried by the leg or land surface 12, the carrier body 5, the casing body 6, the covers 7, the surface 12 and the level device body 2 are connected together in substance-to-substance bonded relationship. The Figure also shows the curved region 10 which in this embodiment is interrupted at the surface 12.

FIG. 7 shows a section through the covers 7 and the carrier body 5 of a level device 1. The section plane is parallel to the longitudinal axis of the cavity 4. The view is so selected that the covers 7 and the carrier body 5 are shown sectioned, the level device body 2 for the sake of clarity of the drawing is unsectioned. The embodiment of FIG. 7 shows the situation in which the carrier body 5 of the level device 1 only comprises material regions supporting the level device body 2. Therefore there is no casing body 6, but the level device body 2 is connected to the covers 7 by way of material regions of the carrier body 5. This means that the carrier body 5 does not necessarily have to have a casing body 6. It is also conceivable that the level device 1 only comprises covers 7, level device body 2 and carrier body 5 and the carrier body 5 is only in the form of a material connection in relation to the covers 7.

FIG. 8 shows a level device as shown in FIG. 1. It can be clearly seen that the curved region 10 extends over the entire periphery around the level device body 2 and is interrupted neither by edges nor by a leg or land.

FIG. 9 shows a spirit level 13 with a level device according to the invention in the installed condition. The level device 1 is here in the form of a vertical level device. The spirit level 13 preferably comprises a hollow profile member. Usually, aluminum hollow profile members are used.

LIST OF REFERENCE NUMERALS USED 1 level device
2 level device body
3 inside wall of the level device body
4 cavity for accommodating a liquid and the marking body
5 carrier body
6 casing body
7 cover
8 outside wall of the level device body
9 marking body
10 curved regions
11 plug for closing the cavity
12 leg/land surface
13 spirit level
14 material openings

The invention claimed is:
1. A level device for a spirit level comprising:
a level device body; and
a substantially cylindrical cavity formed by an inside wall of the level device body, wherein the cavity has a longitudinal axis and serves to accommodate a liquid, wherein the level device body is arranged in a carrier body, wherein the carrier body includes two transparent covers for closing the carrier body,
wherein an outside wall of the level device body has, in relation to the longitudinal axis of the cavity, at least two mutually oppositely disposed curved regions, by which a magnifying glass effect can be achieved when viewing a marker body which can be arranged in the cavity, wherein a curvature of the at least two mutually oppositely disposed curved regions is designed such that the contour of the outside wall of the level device body in a section through the level device body in the longitudinal direction of the cavity forms a circular arc or approximately a circular arc.
2. A level device as set forth in claim 1,
wherein the carrier body further includes a casing body, and
either the level device body and the casing body of the carrier body
or at least one of the covers and at least a part of the level device body are produced in one piece.
3. A level device as set forth in claim 1, wherein both covers and the level device body are produced in one piece.
4. A level device as set forth in claim 1, wherein the carrier body further includes a casing body, and the level device body and the casing body of the carrier body and one of the covers are produced in one piece.
5. A level device as set forth in claim 1, wherein the carrier body further includes a casing body, and the level device body and the casing body of the carrier body and both covers are produced in one piece.
6. A level device as set forth in claim 1, wherein the at least two mutually oppositely disposed curved regions are connected together by further curved regions so as to form a curved region which is peripherally closed around the longitudinal axis of the level device body.
7. A level device as set forth in claim 1, wherein the at least two mutually oppositely disposed curved regions are arranged peripherally spaced from each other.
8. A level device as set forth in claim 1, wherein the at least two mutually oppositely disposed curved regions are peripherally spaced from each other by a leg.
9. A level device as set forth in claim 1, wherein the outside wall of the level device body is spaced at least in the at least two mutually oppositely disposed curved regions from the covers of the carrier body.
10. A level device as set forth in claim 1, wherein the level device body is connected to the carrier body only at at least one of the end regions of its longitudinal axis.

11. A level device as set forth in claim 1, wherein the level device body is of an edge-free configuration at least in the at least two mutually oppositely disposed curved regions of the outside wall.

12. A level device as set forth in claim 1, wherein the curvature of the at least two mutually oppositely disposed curved regions is provided in the longitudinal direction of the level device body.

13. A level device as set forth in claim 1, wherein the curvature of the at least two mutually oppositely disposed curved regions is provided in the transverse direction of the level device body.

14. A level device as set forth in claim 1, wherein the cavity is partially filled with at least one liquid and is closed by a plug.

15. A level device as set forth in claim 1, wherein the carrier body further includes a casing body, and a light-enhancing substance is applied at the periphery of the casing body of the carrier body.

16. A spirit level comprising at least one level device as set forth in claim 1, wherein a main body of the spirit level is in the form of a hollow profile.

17. A spirit level comprising at least one level device as set forth in claim 1, wherein the at least one level device is arranged in a main body of the spirit level as a vertical level device.

18. A process for the production of a level device as set forth in claim 1, comprising forming the carrier body and the level device body in one piece in a plastic injection molding process.

19. A level device as set forth in claim 1, wherein the carrier body further includes a casing body.

20. A level device as set forth in claim 19, wherein the casing body is in the form of a circular ring.

* * * * *